Jan. 16, 1968   T. W. STINSON, JR   3,363,310
ELECTRICAL GROUNDING METHOD AND MEANS
Filed Jan. 27, 1966   3 Sheets-Sheet 1

INVENTOR
THOMAS W. STINSON, JR.
BY
Channing P. Richards &
Dalbert U. Shefte
ATTORNEYS Jan. 16, 1968  T. W. STINSON, JR  3,363,310
ELECTRICAL GROUNDING METHOD AND MEANS
Filed Jan. 27, 1966  3 Sheets-Sheet 2
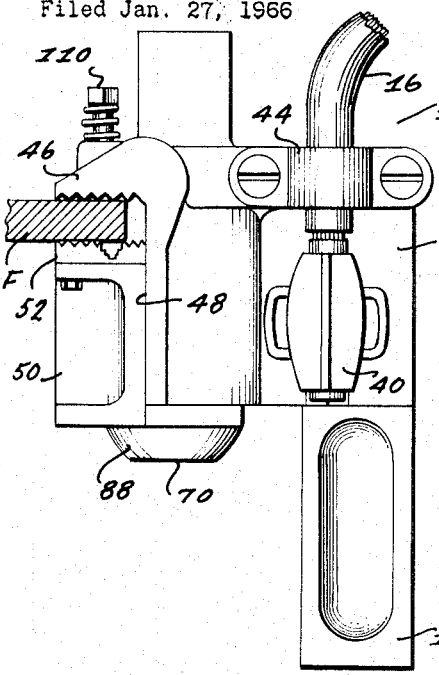
*Fig. 3*
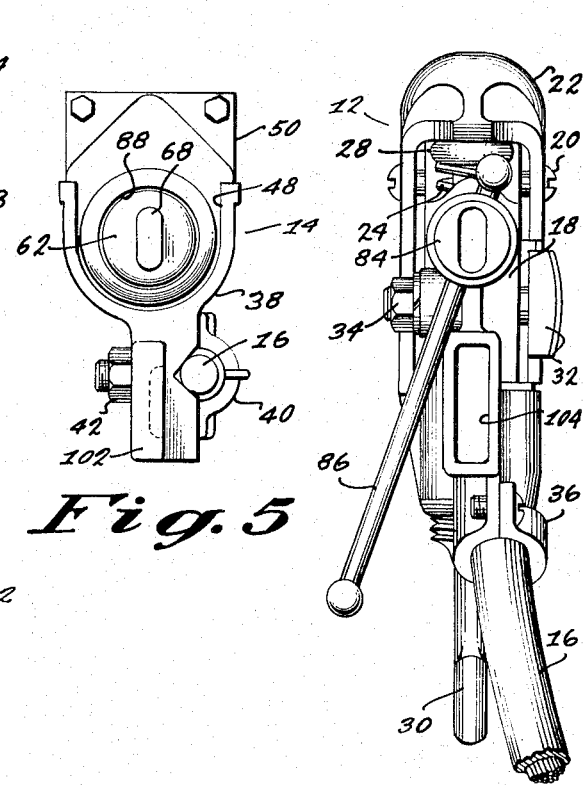
*Fig. 5*
*Fig. 4*
*Fig. 6*
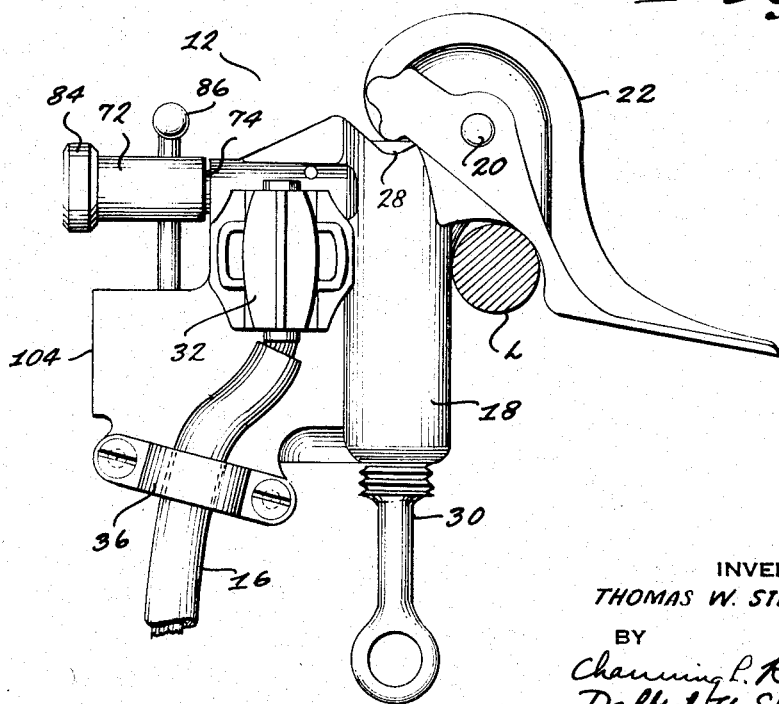
INVENTOR
THOMAS W. STINSON, JR.
BY
ATTORNEYS Jan. 16, 1968   T. W. STINSON, JR   3,363,310
ELECTRICAL GROUNDING METHOD AND MEANS
Filed Jan. 27, 1966   3 Sheets-Sheet 3
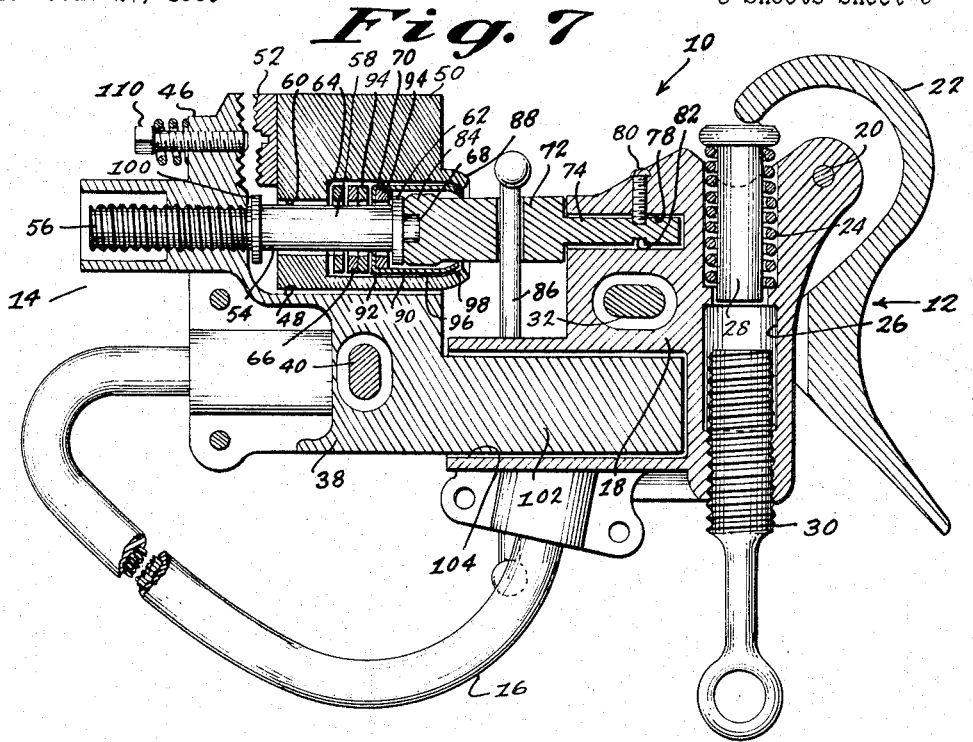
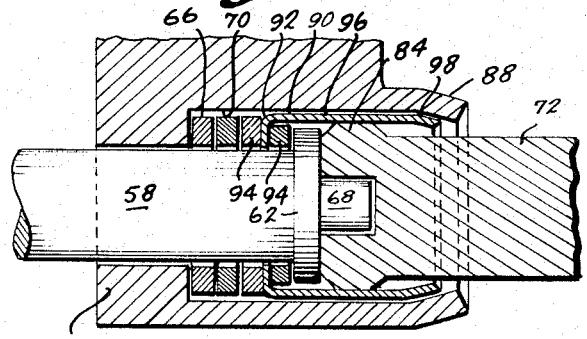
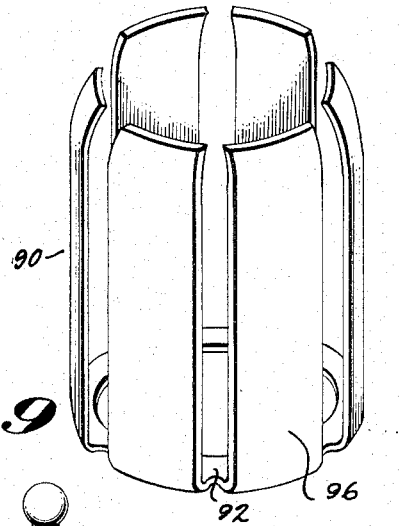
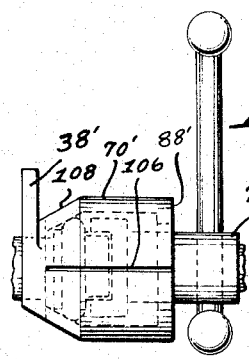
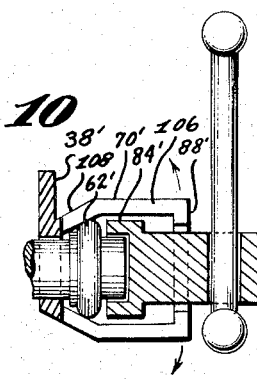
INVENTOR
THOMAS W. STINSON, JR.
BY
Channing P. Richards &
Dalbert U. Shefte
ATTORNEYS United States Patent Office 3,363,310
Patented Jan. 16, 1968

3,363,310
ELECTRICAL GROUNDING METHOD
AND MEANS
Thomas W. Stinson, Jr., 5408 Dunstan Court,
Charlotte, N.C. 28205
Filed Jan. 27, 1966, Ser. No. 523,329
17 Claims. (Cl. 29—628)

ABSTRACT OF THE DISCLOSURE

A clamp for clamping to a ground is electrically connected to a line clamp by a conductor and mechanically connected to each other by means which requires the application of the ground clamp to the ground before the line clamp can be released. The line clamp must be reassembled to the ground clamp before the latter can be released, whereby the user can not apply the line clamp prior to application of the ground clamp nor release the ground clamp prior to releasing the line clamp.

---

The present invention relates to an electrical grounding method and means, and more particularly to a method and means for temporarily grounding an electrical line with an electrically connected pair of ground and line clamps in an unhazardous sequence that is imposed in a manner to preclude grounding in a hazardous improper sequence that could cause injury to the lineman from an electrical shock during attachment.

Normally, the grounding of electrical lines, particularly high-tension lines, is a hazardous operation that requires extreme caution and alertness by the lineman to avoid serious injury. The safe sequence for attaching grounding clamps is to clamp first to a grounded member or to the ground itself and subsequently clamp to the electrical line. If the lineman acts hastily or carelessly and reverses the sequence by clamping to the line first, the ground clamp will be ungrounded and could seriously shock or even electrocute a careless lineman. A significant number of experienced, as well as inexperienced, linemen have been killed in this way, and it is the prevention of injury in this manner to which the present invention is directed.

Briefly described, the present invention provides for removably attaching a pair of line and ground clamps to an electrical line and to a grounded member for temporarily grounding the line through an electrical conduit that extends between the clamps by first retaining the line clamp directly attached to the ground clamp against separation of the clamps as long as the ground clamp is not clamped to the grounded member, then clamping the ground clamp with the line clamp attached thereto to the grounded member, then detaching the line clamp from the clamped ground clamp while maintaining the ground clamp against unclamping as long as the line clamp is not attached thereto, and, finally, clamping the detached line clamp to the electrical line to complete the grounding of the line. Removal of the clamps to unground the line is accomplished by first unclamping the line clamp from the electrical line to disconnect the grounding of the line while maintaining the ground clamp against unclamping, then attaching the unclamped line clamp to the ground clamp to permit unclamping of the ground clamp from the grounded member, and, finally, removing the attached ground clamp and line clamp from the grounded member. Preferably, the clamping and unclamping of the ground clamp is done by manipulating the line clamp so that attachment of the line clamp to the ground clamp is assured during these steps, thereby preventing improper and hazardous attachment of a separate line clamp to the electrical line before the ground clamp is grounded.

This safe grounding method is imposed by the means of the present invention, which comprises a clamp for clamping a grounded member, a clamp for clamping an electrical line, an electrical conduit connecting the clamps, and means for releasably attaching the line clamp to the ground clamp to permit clamping of the ground clamp to the grounded member while the line clamp is attached thereto and permitting separation of the line clamp for subsequent clamping to the electrical line to complete the grounding of the line to the grounded member. Preferably, the attaching means is unreleasable when the ground clamp is unclamped to prevent separation of the clamps and is releasable when the ground clamp is clamped to permit separation of the line clamp for subsequent clamping to the electrical line, and means are provided for manipulating the ground clamp, which manipulating means is operable when the line clamp is attached to the ground clamp and is inoperable when the line clamp is separated from the ground clamp, as by forming the manipulating means on the line clamp or compositely with one component on the line clamp so that when the clamps are separated the ground clamp cannot be manipulated.

In the preferred embodiment, the manipulating means includes an operating element carried by the ground clamp with a portion disposed in a socket in which a rotatable plug carried by the line clamp is receivable for engagement with the operating element portion for manipulation of the ground clamp upon rotation of the plug. Means retain the plug in the socket when the ground clamp is unclamped to prevent separation of the clamps and is releasable when the ground clamp is clamped to permit separation of the clamps. This retaining means comprises an inwardly tapered rim on the socket and an expandable retaining washer around the plug in the socket and controlled by displacement of the operating element portion to be in an expanded position within the socket when the ground clamp is clamped to permit separation of the plug from the socket and retained against expansion at the tapered socket rim when the ground clamp is unclamped to engage the plug and prevent passage of the plug through the tapered socket rim so that the clamps cannot be separated. Alternatively, the tapered socket rim itself can be formed to retain the plug in the socket and to expand by displacement of the operating element portion to release the plug when the ground clamp is clamped.

To prevent inadvertent, or intentional, closing of the ground clamp sufficiently to allow separation of the line clamp without the ground clamp being clamped to the grounded member or some other object, means are provided for limiting displacement of the operating element.

Further, means are provided in the preferred embodiment for guiding and stabilizing attachment of the line clamp to the ground clamp. This guiding and stabilizing means comprises a stud extending from one of the clamps parallel to the aforementioned plug and socket engagement and a bore in the other clamp aligned with the stud for receipt of the stud upon engagement of the plug in the socket.

The various features and advantages of the present invention are incorporated in the preferred embodiment described in detail hereinbelow and illustrated in the accompanying drawings, in which:

FIG. 3 is a side view of the ground clamp shown clamped to a grounded member;

FIG. 4 is a side view of the line clamp shown clamped to an electrical line;

FIGS. 5 and 6 are end views of the facing ends of the ground clamp and line clamp, respectively;

FIG. 7 is a vertical sectional view taken along the centerline of the grounding means as viewed from the direction opposite that of FIG. 2;

FIG. 8 is an enlarged vertical sectional view of the plug and socket portion of FIG. 7, showing the elements in plug releasing position;

FIG. 9 is an enlarged perspective view of the expandable retaining washer of the plug and socket portion of FIG. 8;

FIG. 10 is a fragmentary view of an alternative embodiment of the plug and socket portion; and FIG. 11 is a sectional view of the alternative plug and socket portion of FIG. 10 as viewed along the centerline thereof.

Figure 1:
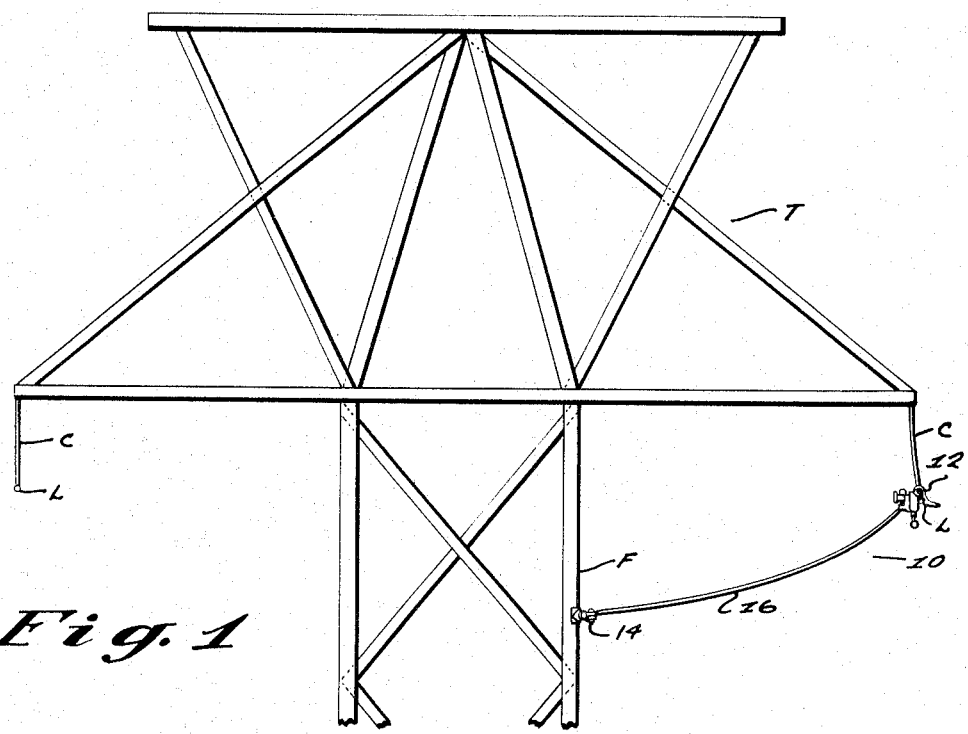
FIG. 1 is an elevation view of a high-tension line tower with the grounding means of the preferred embodiment attached thereto.

The illustrated embodiment of the grounding means 10 of the present invention is shown in FIG. 1 attached to a high tension line L that is suspended by a cable C from a typical high-tension line tower T. The grounding means 10 includes a line clamp 12 clamped to the high-tension line L and a ground clamp 14 clamped to the frame F of the tower T, with the clamps electrically connected through the conduit 16 for grounding of the high-tension line L to the tower frame F.

The line clamp 12 includes a body member 18 carrying a pivot pin 20 on which is pivotally mounted a movable jaw 22. This movable jaw 22 is yieldably urged against the ground clamp body member 18 for clamping of the high-tension line L therebetween by a coil spring 24 seated in a recess in the body member 18 and acting against the head of a plunger 28 that, in turn, acts on the movable jaw 22. Threaded in the body member 18 and extending into the inner end of the recess 26 is a clamping screw 30 that is initially spaced from the inner end of the plunger 28 to permit inward movement of the plunger in the recess when the movable jaw 22 opens to receive the high-tension line L, following which the clamping screw 30 is tightened against the plunger 28 to lock the movable jaw 22 in clamping relation against the high-tension line.

The connecting conduit 16 is secured to and electrically connected to the line clamp body member 18 by a T-bolt connector 32 that extends through the body member 18 for securement thereto by a nut 34 on the opposite side of the body member. The connecting conduit 16 is further held on the body member 18 by a U-shaped bracket 36 that is screwed to the body member 18.

The connecting conduit 16 is similarly attached to the body member 38 of the ground clamp 14 with a T-bolt connector 40 and nut 42, and with a U-shaped bracket 44 that is screwed to the ground clamp body member 38.

The ground clamp body member 38 is formed with an upstanding fixed jaw 46 that faces an elongated U-shaped slot 48 in which a movable jaw body 50 slides. This movable jaw body 50 has a detachable jaw face 52 facing the fixed jaw 46 for clamping against a grounded member, such as the aforementioned tower frame F.

The movable jaw body 50 is manipulated for clamping and unclamping by an operating rod 54 that has an end portion 56 threaded in the body member 38 below the fixed jaw 46 and axially aligned with the movable jaw body 50. The operating rod 54 also has a portion 58 extending into a bore 60 formed in the movable jaw body.

The operating rod portion 58 in the bore 60 has an enlarged head 62 that acts against a shoulder 64 in the bore 60 through an intermediate compressible spring washer 66 for movement of the movable jaw body 50 with respect to the fixed jaw 46 upon rotation of the operating rod 54.

The operating rod 54 is manipulated by engagement of a protruding key 68 extending axially from the head 62 of the operating rod 54 within the bore 60 of the movable jaw body 50, which bore 60 extends outwardly to form a socket 70 enclosing the keyed operating rod head 62 so that it is not normally accessible for manipulation of the movable jaw body 50, but is engageable by a rotatable plug 72 that is carried by the line clamp 12.

This plug 72 has a shank 74 seated in a recess 78 in the line clamp body member 18 and retained therein for free rotation by a retaining screw 80 extending through the body member 18 into the recess 78 and seated in an annular recess 82 in the plug shank 74.

The outer end of the plug 72 is insertable in the socket 70 of the ground clamp movable jaw body 50 and has a head 84 at its outer end keyed for engagement of the operating rod key 68 to cause rotation of the operating rod 54 upon rotation of the plug 72, which is accomplished manually through the radial handle 86 carried by the plug 72 in the space between the socket 70 and the line clamp body member 18.

The head 84 of the plug 72 is slightly enlarged and the outer end of the socket 70 is swaged inwardly to form an inwardly tapered socket rim 88 of a diameter slightly greater than the diameter of the enlarged plug head 84 to permit insertion and removal of the plug 72 which respect to the socket 70.

The plug 72 is retained in the socket 70 against removal when the ground clamp 14 is unclamped so that the line clamp 12 cannot be separated from the ground clamp 14 by an expandable retaining washer 90 that has an annular base 92 disposed between a pair of bearing washers 94 mounted on the operating rod portion 58 between the operating rod head 62 and the compressible spring washer 66. This retaining washer 90 extends cylindrically outward toward the socket rim 88 and is split longitudinally to form radially expandable fingers 96, the outer ends 98 of which are inwardly tapered for seating in the tapered socket rim 88 to reduce the effective diameter of the rim sufficiently to prevent withdrawal of the enlarged head 84 of the plug 72. The longitudinal extent of the expandable fingers 96 is less than the longitudinal extent of the socket 70 so that when the ground clamp 14 is clamped against an object and the operating rod 54 advances in the socket 70 sufficiently to compress the spring washer 66, the finger ends 98 of the retaining washer 90 will be disposed inwardly of the tapered socket rim 88 so that they can expand against a wall of the socket 70 to permit withdrawal of the plug 72. FIG. 7 shows the retaining washer 90 with its fingers 96 disposed at the socket rim 88 to prevent removal of the plug 72 from the socket 70, and FIG. 8 shows the retaining washer 90 disposed inwardly of the socket rim 88 to permit withdrawal of the plug 72 from the socket 70. The expandable retaining washer 90 is shown separately in FIG. 9.

To prevent the movable jaw body 50 from closing against the fixed jaw 46 without an object therebetween so that the plug 72 could be separated from the socket 70 when the ground clamp 14 is not clamped to an object, advance of the operating rod 54 is limited by a snap ring 100 fixed to the operating rod between the body member 38 and the movable jaw body 50 for abutment against the body member 38 to stop advance of the operating rod 54. This snap ring 100 is spaced from the operating rod head 62 sufficiently to stop advance of the operating rod 54 before the spring washer 66 is compressed sufficiently to displace the finger ends 98 of the retaining washer 90 out of their plug retaining position in the socket rim 88 when there is no object between the fixed jaw 46 and jaw face 52. When an object is clamped between the jaws, the thickness of the object will result in the spring washer 66 being compressed before the snap ring 100 abuts the body member 38 so that the retaining washer finger ends 98 will be retracted to permit removal of the plug 72 from the socket 70 for separation of the line clamp 12 from the ground clamp 14 and will remain retracted as long as the ground clamp 14 is clamped so that the plug 72 can be subsequently inserted in the socket 70 for manipulation of the operating rod 54 to unclamp the ground clamp 14.

Attachment of the line clamp 12 to the ground clamp 14 is further facilitated and rigidified by a guiding and stabilizing stud 102 formed integrally with the ground clamp body member 38 and extending therefrom parallel to the axis of the plug receiving socket 70 and engageable in a bore 104 formed in the line clamp body member 18 and extending parallel to the axis of the plug 72 at a spacing therefrom equivalent to the spacing of the stud 102 from the socket 70 to permit simultaneous alignment of the plug 72 with the socket 70 and the stud 102 with the bore 104. The stud 102 extends substantially beyond the socket rim 88 so that the stud 102 is engaged in the bore 104 before the plug 72 reaches the socket 70, and the stud 102 and bore 104 are formed with rectangular mating cross sections for orientation of the line clamp 12 with the ground clamp 14 for plug and socket alignment. Thus, the stud and bore engagement serves to initially align the clamps, to guide the clamps in proper alignment for attachment, and to stabilize and rigidify the clamps in their attached disposition.

Alternative means for attaching and retaining the clamps together is illustrated in FIGS. 10 and 11, in which the socket 70' is seen to be an extension of the ground clamp body member 38 with the walls of the socket 70' being longitudinally split, as at 106 to permit radial expansion of the inturned socket rim 88'. The operating rod head 62' is enlarged for engagement of the inner tapered wall 108 at the base of the socket 70 so that upon tightening of the operating rod 54 the head 62 will advance against the tapered wall 108 to force the split socket 70' to expand sufficiently to permit withdrawal of the enlarged head 84' of the plug 72'.

Figure 2:
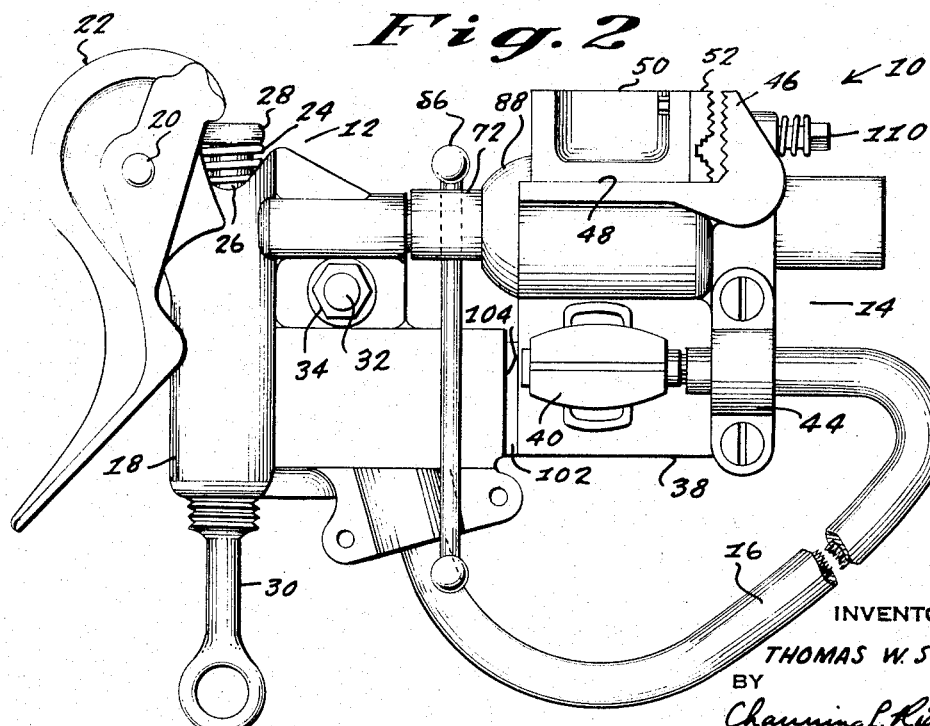
FIG. 2 is a side view of the grounding means of FIG. 1 with the lineclamp attached to the ground clamp.

As seen in FIGS. 2 and 7, the fixed jaw 46 and the detachable jaw face 52 are formed primarily for engagement of flat surfaces, although the detachable jaw face 52 is recessed to some extent to facilitate engagement of objects with curved surfaces. As it is necessary for grounding, and particularly for the protection of the linemen, that positive electrical contact is made by the fixed jaw 46 and jaw face 52 with the grounded object, a hollow-point set screw 110 is threaded through the fixed jaw 46 for tightening against the surface of the object clamped to break through any covering, corrosion or other insulating material and obtain positive contact.

The grounding means 10 of the illustrated embodiment is normally assembled at the time of manufacture with the line clamp 12 attached to the ground clamp 14 in the aforementioned plug and socket connection, with the plug 72 retained in the socket 70 by the retaining washer 90 such that the line clamp 12 cannot be removed from the ground clamp 14. For this reason, a lineman cannot pick up a line clamp 12 and attempt to clamp it to an electrical line without also picking up the ground clamp 14, which is an immediate indication to him that he is following the wrong procedure. Further, the weight and unbalance produced by the attachment of the clamps makes it difficult and almost impossible to attach the line clamp to the line, and even should the clamps be connected to the line first, the ground clamp is attached to the line clamp at the line and would not be hanging as a hazard to the lineman.

Rather than attaching the line clamp 12 first, the lineman is required from necessity and convenience to attach the ground clamp 14 to the grounded member, such as the tower frame F, in order to release the line clamp 14 for line clamping. Clamping of the ground clamp 14 is accomplished by manipulating the handle 86 to rotate the plug 72, causing the movable jaw body 50 to advance against the clamped object with further rotation of the plug 72 causing the operating rod to advance in the socket 70 sufficient to move the retaining washer 90 out of the socket rim 88 so that the plug 72 can be detached from the socket 70, thereby permitting detachment of the line clamp 12 from the ground clamp 14.

The line clamp 12 can then be clamped to the line to complete grounding of the line through the line clamp 12, connecting conduit 16, ground clamp 14 and tower frame F. During the grounding attachment the ground clamp 14 cannot be unclamped as the key 68 on the operating rod head 62 is disposed inaccessibly within the socket 70 and cannot be manipulated to open the ground clamp 14 until the line clamp 12 is attached. Therefore, the lineman cannot inadvertently or intentionally remove the ground clamp 14 and create the hazardous circumstance of an ungrounded clamp connected through the conduit 16 and line clamp 12 to the electrical line.

To remove the grounding means 10, it is necessary for the lineman to remove first the line clamp 12 from the line, thereby breaking contact with the line, and then attaching the line clamp 12 to the ground clamp 14 by aligning the stud 102 with the bore 104 and the plug 72 with the socket 70. The clamps are then pushed together and the plug 72 rotated sufficiently to engage the key 68, following which the handle 86 is manipulated to screw the operating rod 54 away from the fixed jaw 46 to open the movable jaw body 50. As the operating rod 54 is advanced, the spring washer 66 will expand, forcing the retaining washer 90 to move upwardly until its finger ends 98 are in the inwardly tapered socket rim 88, which prevents passage of the plug head 84 through the socket rim 88. Thus, the clamps are attached together and cannot be separated until the ground clamp 14 is again clamped to an object. Should an attempt be made to close the ground clamp 14 to permit separation of the clamps when there is no object in the ground clamp 14, the snap ring 100 will limit movement of the operating rod 54 so that the rod head 62 cannot advance sufficiently to move the retaining washer out of plug retaining position in the socket rim 88.

The direct attachment of the clamps that is necessary to effect unclamping of the ground clamp from the grounded member provides a further safety feature when a plurality of clamp sets are being used to ground a number of lines at the same time, in which circumstance a lineman may inadvertently attach a removed line clamp of one set to a ground clamp of the second set and remove that ground clamp while its line is still attached to an electrical line. If this mistake is made, the direct attachment of the line clamp to the ground clamp results in an electrical connection of the two sets in series to maintain the grounding condition from the clamped line clamp of the second set through the attached line and ground clamps to the clamped ground clamp of the first set.

Thus, the mounting means 10 of the present invention imposes a proper unhazardous clamping sequence that prevents exposure of the lineman to electrical shock by improper grounding.

It is to be understood that the preceding detailed description has been provided as an example of the present invention and is not intended to limit the scope thereof, which scope is not intended to be limited except as defined in the appended claims.

I claim:

1. A method of removably attaching a pair of line and ground clamps in an unhazardous sequence to an electrical line and to a grounded member for temporarily grounding the line through an electrical conduit that extends between the clamps, said method comprising the steps of retaining the line clamp directly attached to the ground clamp against separation of the clamps as long as the ground clamp is not clamped to the grounded member, clamping the ground clamp with the line clamp attached thereto to the grounded member, detaching the line clamp from the clamped ground clamp while maintaining the ground clamp against unclamping as long as the line clamp is not attached thereto, and clamping the detached line clamp to the electrical line to complete the grounding of the line.

2. The method of removably attaching a pair of line and ground clamps for temporarily grounding an electrical line in an unhazardous sequence according to claim 1 and characterisized further in that the step of clamping the ground clamp to the grounded member includes clamping the ground clamp by manipulating the line clamp is attached to the ground clamp.

3. The method of removably attaching a pair of line and ground clamps for temporarily grounding an electrical line in an unhazardous sequence according to claim 1 and characterized further in that the clamps are subsequently detached by the steps of unclamping the line clamp from the electrical line to disconnect the grounding of the line while maintaining the ground clamp against unclamping, attaching the unclamped line clamp directly to the ground clamp to permit unclamping of the ground clamp from the grounded member, and removing the attached ground clamp and line clamp from the grounded member.

4. The method of removably attaching a pair of line and ground clamps for temporarily grounding an electrical line in an unhazardous sequence according to claim 3 and characterized further in that the step of clamping the ground clamp to the grounded member includes clamping the ground clamp by manipulating the line clamp while the line clamp is attached to the ground clamp, and the step of removing the attached clamps from the grounded member includes unclamping the ground clamp by manipulating the line clamp while the line clamp is attached to the ground clamp.

5. Means operable in an unhazardous sequence for temporarily grounding an electrical line to a grounded member, said means comprising a clamp for clamping the grounded member, a clamp for clamping the electrical line, an electrical conduit connecting said clamps, and means for releasably attaching said line clamp directly to said ground clamp to permit clamping of the ground clamp to the grounded member while the line clamp is attached thereto and permitting separation of the line clamp for subsequent clamping to the electrical line to complete the grounding of the line to the grounded member.

6. Means operable for temporarily grounding an electrical line according to claim 5 and characterized further in that said attaching means is unreleasable when the ground clamp is unclamped to prevent separation of the clamps and is releasable when the ground clamp is clamped to permit separation of the line clamp for subsequent clamping to the electrical line.

7. Means operable for temporarily grounding an electrical line according to claim 6 and characterized further in that said attaching means comprises a plug extending from one of said clamps, a socket in the other of said clamps for receipt of said plug, and means for retaining said plug in said socket when said ground clamp is unclamped to prevent separation of the clamps and releasable when the ground clamp is clamped to permit separation of the clamps.

8. Means operable for temporarily grounding an electrical line according to claim 7 and characterized further by means for guiding and stabilizing the attachment of the line clamp to the ground clamp, said guiding and stabilizing means comprising a stud extending from one of said clamps parallel to the plug and socket engagement and a bore in the other of said clamps aligned for receipt of said stud upon engagement of said plug in said socket.

9. Means operable for temporarily grounding an electrical line according to claim 5 and characterized further by means for manipulating said ground clamp, said manipulating means being operable to clamp and unclamp said ground clamp when said line clamp is attached thereto and being inoperable when said line clamp is separated from said ground clamp.

10. Means operable for temporarily grounding an electrical line according to claim 9 and characterized further in that said manipulating means is compositely formed with a component on said ground clamp and a component on said line clamp, said components being engageable when the line clamp is attached to said ground clamp to permit operation of said manipulating means and being disengaged when the clamps are separated to prevent operation of said manipulating means.

11. Means operable for temporarily grounding an electrical line according to claim 5 and characterized further by means carried by said line clamp and engageable with said ground clamp when the line clamp is attached to the ground clamp for clamping and unclamping manipulation of said ground clamp.

12. Means operable for temporarily grounding an electrical line according to claim 11 and characterized further in that said manipulating means is a rotatable plug, and in that said ground clamp has a socket for receipt of said plug and has an operating element with a portion in said socket for operating engagement by said plug to manipulate said ground clamp upon rotation of the plug.

13. Means operable for temporarily grounding an electrical line according to claim 12 and characterized further by means for retaining said plug in said socket when the ground clamp is unclamped to prevent separation of the clamps and releasable when the ground clamp is clamped to permit separation of the clamps.

14. Means operable for temporarily grounding an electrical line according to claim 13 and characterized further in that said operating element portion is displaced in said socket upon operation by said manipulating means, and said retaining means comprises an inwardly tapered rim on said socket and an expandable retaining washer around said plug in said socket and controlled by the position of the operating element portion to be in an expanded position within the socket when the ground clamp is clamped to permit separation of the plug from the socket and to be retained against expansion at the socket rim when the ground clamp is unclamped to engage said plug and prevent passage of the plug through said socket tapered rim.

15. Means operable for temporarily grounding an electrical line according to claim 13 and characterized further in that said operating element portion is displaced in said socket upon operation by said manipulating means, and said retaining means comprises an inwardly tapering rim on said socket engageable with said plug to prevent passage of the plug through the socket rim when the ground clamp is unclamped, said socket rim being expandable by displacement of said element portion when the ground clamp is clamped to permit passage of the plug through the socket rim.

16. Means operable for temporarily grounding an electrical line according to claim 13 and characterized further in that said operating element portion is displaced in said socket upon operation by said manipulating means, said retaining means is controlled by displacement of said operating element portion, and means is provided for limiting displacement of said operating element to prevent release of said retaining means when said ground clamp is manipulated for clamping without an object in the ground clamp.

17. Means operable for temporarily grounding an electrical line according to claim 5 and characterized further in that said attaching means electrically connects said line clamp to said ground clamp.

References Cited

UNITED STATES PATENTS

| | | |
|---|---|---|
| 1,968,736 | 7/1934 | Bodendieck _____ 339—109 |
| 2,031,921 | 2/1936 | Bodendieck. |

FOREIGN PATENTS

| | | |
|---|---|---|
| 4,303 | 1912 | Great Britain. |
| 899,622 | 6/1962 | Great Britain. |

MARVIN A. CHAMPION, *Primary Examiner.*

PATRICK A. CLIFFORD, *Examiner.*

UNITED STATES PATENT OFFICE
CERTIFICATE OF CORRECTION

Patent No. 3,363,310

January 16, 1968

Thomas W. Stinson, Jr.

It is hereby certified that error appears in the above numbered patent requiring correction and that the said Letters Patent should read as corrected below.

Column 7, line 3, after "clamp", second occurrence, insert -- while the line clamp --.

Signed and sealed this 15th day of April 1969.

(SEAL)
Attest:

Edward M. Fletcher, Jr.
Attesting Officer

EDWARD J. BRENNER
Commissioner of Patents